H. B. STOCKS.
SCOOTER.
APPLICATION FILED MAR. 26, 1919.

1,315,878.

Patented Sept. 9, 1919.
2 SHEETS—SHEET 1.

Witnesses:

Inventor
Harry Benwell Stocks
by
Attorney

H. B. STOCKS.
SCOOTER.
APPLICATION FILED MAR. 26, 1919.

1,315,878.

Patented Sept. 9, 1919.
2 SHEETS—SHEET 2.

Witnesses:

Inventor
Harry Benwell Stocks
by
Attorney

UNITED STATES PATENT OFFICE.

HARRY BENWELL STOCKS, OF STOCKPORT, ENGLAND.

SCOOTER.

1,315,878.     Specification of Letters Patent.     Patented Sept. 9, 1919.

Application filed March 26, 1919. Serial No. 285,317.

*To all whom it may concern:*

Be it known that I, HARRY BENWELL STOCKS, a British subject, residing at Stockport, county of Chester, England, have invented new and useful Improvements in Scooters, of which the following is a specification.

This invention relates to scooters which comprise a foot board supported on two wheels, a steering handle attached to the front wheel and a driving mechanism operated by a cranked treadle pivoted to one side of the foot board and connected with the rear wheel.

This invention consists in the particular construction, disposition and combination of parts whereby a driving quadrant with internal teeth is fulcrumed on the rear fork (or plates forming the fork) between the hub of the driving wheel and the foot board of the scooter.

The invention will be described with reference to the accompanying drawings.

The foot board A is of wood or metal, provided with a foot support $a'$ to one side of the longitudinal center and to it is fitted extension bars or plates $a$ forming a rear fork to carry the driving wheel B. The foot board A is mounted upon the rear driving wheel B and front steering wheel C the latter being carried by the steering pillar $C'$, and on the axle of the driving wheel B a pinion $c$ is mounted to run loose, a ratchet wheel $c'$ being cast with it or attached to it so that the two rotate together.

A quadrant D with internal teeth $d$ is pivoted on a stud $d'$ on one of the rear bars $a$ of the back fork between the hub of the driving wheel B and the foot board A, the quadrant embracing the axle and pinion $c$ of the driving wheel B and its teeth $d$ meshing with the teeth on the rear side of the pinion $c$ and actuating it to drive the wheel B in a forward direction by the upward movement of the quadrant.

The driving wheel B carries on the hub at one side of it a pivoted pawl $b$ controlled by a spring $b'$. The pawl $b$ engages the teeth of the ratchet wheel $c'$ affixed to the pinion $c$ (or it may engage directly with the teeth of the latter) and conveys the rotary motion of the pinion $c$ in a forward direction to the driving wheel B.

By this construction as the quadrant D rises, the pinion $c$ is rotated, and the pawl transmits the movement to the driving wheel B which rotates in the forward direction. When the quadrant D and pinion $c$ are at rest or moving on the return stroke, the driving wheel B will continue to rotate forward under the impetus of the last stroke of the pedal $D'$ the pawl $b$ riding over the teeth of the ratchet or pinion.

A spring E of any suitable construction returns the quadrant to its initial position when the pressure on the pedal is removed.

In the form of the invention shown in Figs. 1 to 4 a pedal lever $D'$ is affixed to the quadrant D the downward movement of which by the foot of the rider causes the upward movement of the teeth $d$ and the consequent forward movement of the scooter.

Figure 1:
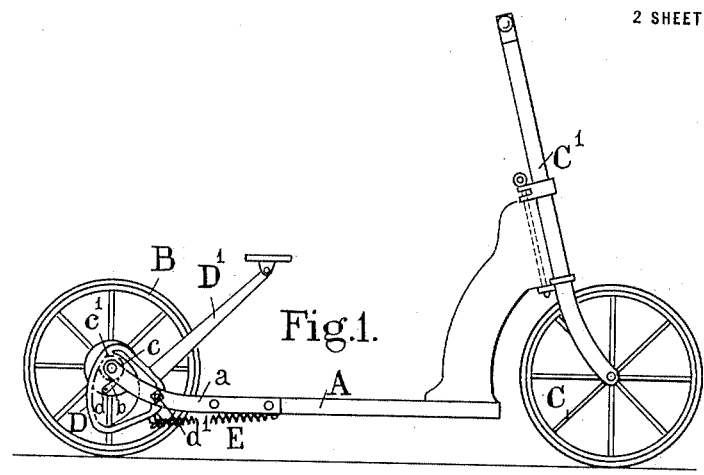
Figure 1 is a side elevation of the improved construction of scooter.
Figure 2:
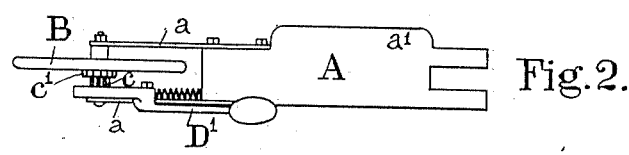
Fig. 2 is a plan of same.
Figure 3:
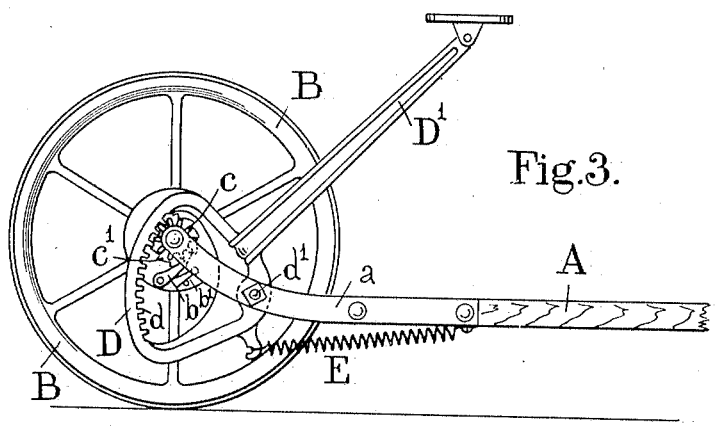
Fig. 3 is a side elevation (enlarged) of the improved motion transmission mechanism and part of the foot board of the scooter.
Figure 4:
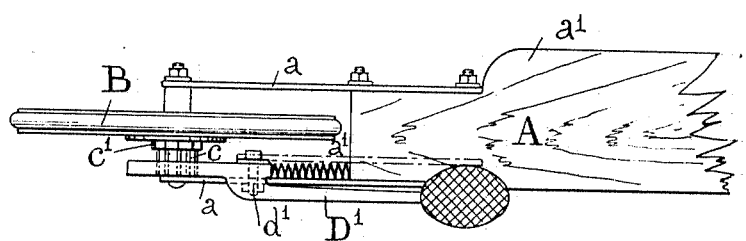
Fig. 4 is a plan of Fig. 3.
Figure 5:
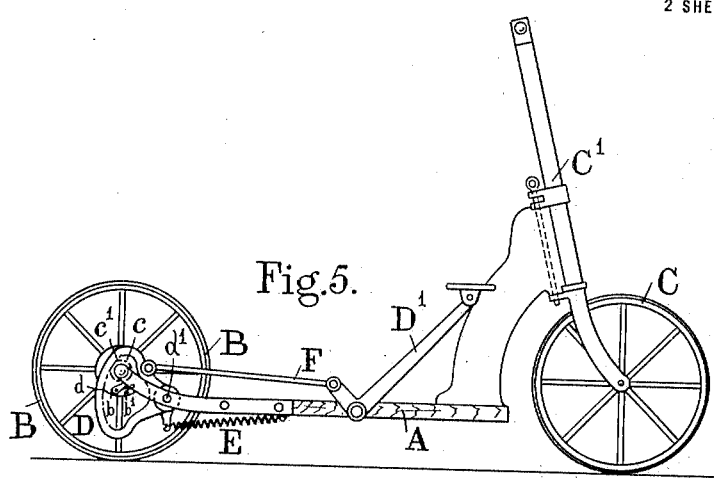
Fig. 5 is a side elevation of the improved construction of scooter with the pedal separately pivoted and connected thereto by a connecting rod.
Figure 6:
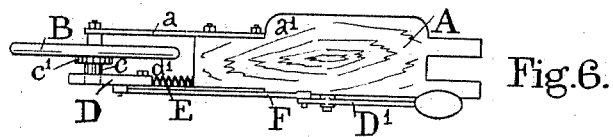
Fig. 6 is a plan of Fig. 5.
Figure 7:
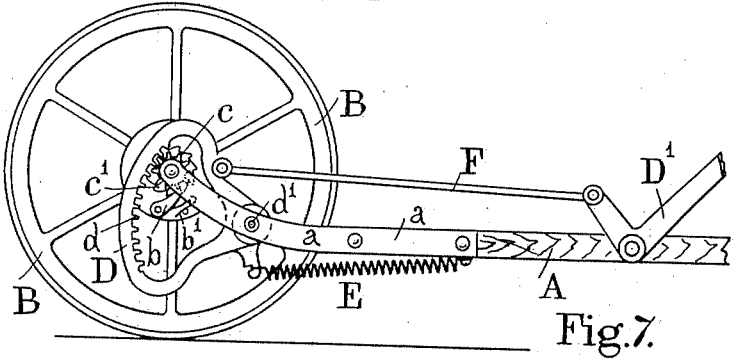
Fig. 7 is a side elevation (enlarged) of the improved motion transmission mechanism with the pedal separately pivoted and connected thereto by a connecting rod.

As shown in Figs. 5 to 7 the pedal lever $D'$ which is fulcrumed to the foot board A, is connected to the quadrant D by a connecting rod F arranged above the foot board.

Figure 8:
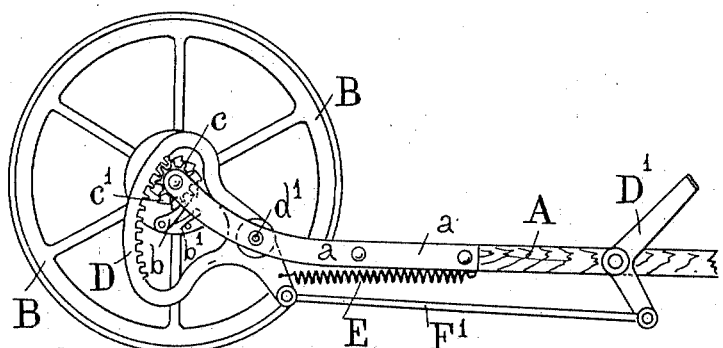
Fig. 8 is a side elevation of same showing the pedal connected to the driving quadrant below the foot board.

In the form shown in Fig. 8, the pedal lever $D'$ fulcrumed on the foot board is connected to the quadrant D by a connecting rod $F'$ arranged below the foot board.

What I claim as my invention and desire to protect by Letters Patent is:—

In a scooter of the class described, a frame, a steering wheel and driving wheel mounted respectively at the forward and rear ends of the frame, a steering column and handle for the steering wheel, the said steering wheel and driving wheel having their treads in line with the longitudinal center of the said frame, a foot support extending to one side of the longitudinal center, a rear fork to carry the driving wheel, an internal toothed quadrant fulcrumed to the rear fork between the hub of the driving wheel and the foot board, a pinion loose on the axle of the driving wheel with which the quadrant teeth mesh, a clutch between the said pinion and the driving wheel adapted, when the pinion is moved in one direction, to impart movement to the driving wheel and to permit the pinion to remain at rest or rotate backwardly while the driving wheel continues to rotate forwardly, a pedal lever to impart the forward stroke to the internal toothed quadrant when the pedal is depressed and spring means to return the quadrant and pedal to normal position at the end of each forward stroke.

In testimony whereof I have hereunto set my hand in presence of two subscribing witnesses.

HARRY BENWELL STOCKS.

Witnesses:
J. OWDEN O'BRIEN,
GEORGE H. O'BRIEN.